(12) United States Patent
Okamoto et al.

(10) Patent No.: US 10,996,191 B2
(45) Date of Patent: May 4, 2021

(54) SENSOR ELEMENT AND GAS SENSOR

(71) Applicant: NGK INSULATORS, LTD., Aichi (JP)

(72) Inventors: Taku Okamoto, Nagoya (JP); Akira Sasaki, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 143 days.

(21) Appl. No.: 16/297,977

(22) Filed: Mar. 11, 2019

(65) Prior Publication Data

US 2019/0285571 A1 Sep. 19, 2019

(30) Foreign Application Priority Data

Mar. 13, 2018 (JP) .............................. JP2018-044958

(51) Int. Cl.
  *G01N 27/406* (2006.01)
  *G01N 27/407* (2006.01)

(52) U.S. Cl.
  CPC ..... *G01N 27/4071* (2013.01); *G01N 27/4062* (2013.01); *G01N 27/4075* (2013.01)

(58) Field of Classification Search
  CPC ........... G01N 27/4062; G01N 27/4075; G01N 27/4077
  See application file for complete search history.

(56) References Cited

U.S. PATENT DOCUMENTS

| 2015/0355142 A1* | 12/2015 | Murakami | ......... G01N 27/4077 |
| | | | 324/464 |
| 2016/0033447 A1* | 2/2016 | Nakasone | ............ G01N 27/301 |
| | | | 204/427 |
| 2017/0184538 A1 | 6/2017 | Okamoto et al. | |

FOREIGN PATENT DOCUMENTS

JP 2017-116371 A 6/2017

* cited by examiner

*Primary Examiner* — Alexander S Noguerola
(74) *Attorney, Agent, or Firm* — Mattingly & Malur, PC

(57) ABSTRACT

A sensor element includes an element main body having an oxygen ion-conducting solid electrolyte body, a detection electrode which is disposed on an outer surface of the element main body and contains Pt and Au, a reference electrode which is disposed in the element main body, a connecting terminal for detection electrode which is disposed on the outside of the element main body, a lead portion for detection electrode which contains Pt, is disposed on the outside of the element main body, and electrically connects between the detection electrode and the connecting terminal for detection electrode, a lower insulating layer which is disposed between the lead portion for detection electrode and the element main body and insulates the two from each other, and an upper insulating layer which covers a surface of the lead portion for detection electrode and has a porosity of 10% or less.

7 Claims, 3 Drawing Sheets

EXPERIMENTAL EXAMPLE6
(BEFORE DURABILITY TEST)

EXPERIMENTAL EXAMPLE6
(AFTER DURABILITY TEST)

EXPERIMENTAL EXAMPLE1
(AFTER DURABILITY TEST)

SENSOR ELEMENT AND GAS SENSOR

The present application is based upon and claims the benefit of priority from Japanese Patent Application No. 2018-044958, filed Mar. 13, 2018, the entire contents of which are incorporated herein by reference.

BACKGROUND OF THE INVENTION

1. Field of the Invention

The present invention relates to a sensor element and a gas sensor.

2. Description of the Related Art

Hitherto, sensor elements which detect a specific gas concentration such as an ammonia concentration in a measurement-object gas, e.g., an exhaust gas of an automobile, have been known. For example, PTL 1 describes a mixed-potential-type sensor element including a detection electrode and a reference electrode provided on an oxygen ion-conducting solid electrolyte. The detection electrode is disposed on a surface of the sensor element. The sensor element has connecting terminals and wiring patterns corresponding to the individual electrodes formed therein. In the sensor element, since a potential difference based on a specific gas concentration in a measurement-object gas occurs between the detection electrode and the reference electrode, the specific gas concentration can be detected by using the potential difference.

CITATION LIST

Patent Literature

PTL 1: JP 2017-116371 A

SUMMARY OF THE INVENTION

In a sensor element provided with a detection electrode and a wiring pattern (lead portion), such as the one described in PTL 1, in some cases, a potential difference (electromotive force) that is supposed to be generated is not generated (the electromotive force decreases), i.e., abnormality occurs in the electromotive force.

The present invention has been made to solve such a problem, and a main object of the invention is to provide a sensor element in which abnormality in the electromotive force is unlikely to occur.

As a result of thorough studies, the present inventors have found that as the period of use of a sensor element becomes longer, the amount of Au in a detection electrode decreases in some cases. The present inventors have considered that the reason for abnormality in the electromotive force is that Au in the detection electrode evaporates and is deposited on (adheres to) a lead portion containing Pt, and have found that, in order to suppress adhesion of Au to the lead portion, by covering the surface of the lead portion with an insulating layer, abnormality in the electromotive force can be suppressed, thus leading to completion of the present invention.

That is, a sensor element of the present invention, which is a mixed-potential-type sensor element that detects a specific gas concentration in a measurement-object gas, includes an element main body having an oxygen ion-conducting solid electrolyte body, a detection electrode which is disposed on an outer surface of the element main body and contains Pt and Au, a reference electrode which is disposed in the element main body, a connecting terminal for detection electrode which is disposed on the outside of the element main body, a lead portion for detection electrode which contains Pt, is disposed on the outside of the element main body, and electrically connects between the detection electrode and the connecting terminal for detection electrode, a lower insulating layer which is disposed between the lead portion for detection electrode and the element main body and insulates the two from each other, and an upper insulating layer which covers a surface of the lead portion for detection electrode and has a porosity of 10% or less.

In the sensor element, the surface of the lead portion for detection electrode is covered with a dense upper insulating layer having a porosity of 10% or less. Therefore, in the sensor element, it is possible to suppress occurrence of a phenomenon in which Au in the detection electrode evaporates and adheres to the lead portion for detection electrode, and abnormality in the electromotive force is unlikely to occur.

In the sensor element of the present invention, the upper insulating layer may have a thickness of 1 µm or more. When the thickness of the upper insulating layer is 1 µm or more, adhesion of Au to the lead portion for detection electrode can be more reliably suppressed. The upper insulating layer may have a thickness of 5 µm or more.

In the sensor element of the present invention, the upper insulating layer may have a thickness of 40 µm or less. When the thickness of the upper insulating layer is 40 µm or less, fracture of the sensor element due to a difference in thermal expansion between the solid electrolyte body and the upper insulating layer can be suppressed.

In the sensor element of the present invention, the upper insulating layer may be formed of a ceramic containing a metal oxide having insulating properties. Furthermore, the metal oxide having insulating properties may be one or more selected from the group consisting of alumina, spinel, titania, mullite, and forsterite. These materials are suitable as a material for the upper insulating layer.

A gas sensor of the present invention includes the sensor element according to any one of the embodiments described above. Therefore, in the gas sensor, the same effects as those of the sensor element of the present invention, for example, an effect in which abnormality in the electromotive force is unlikely to occur, can be obtained.

DETAILED DESCRIPTION OF THE INVENTION

Figure 1:
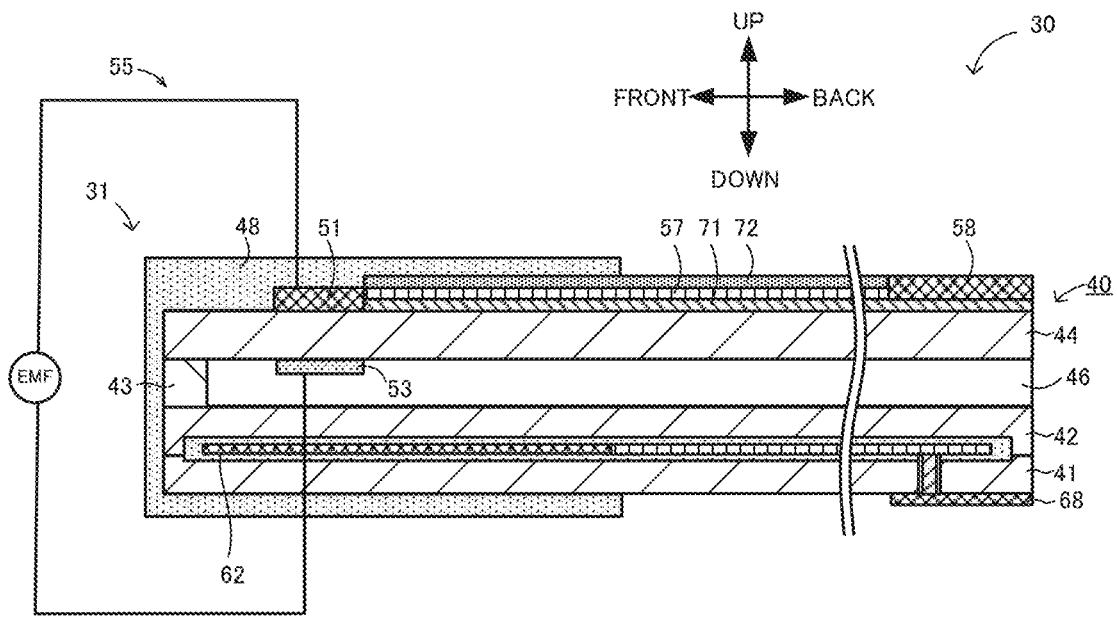
FIG. 1 is a diagram schematically showing a structure of a gas sensor 30.
Figure 2:
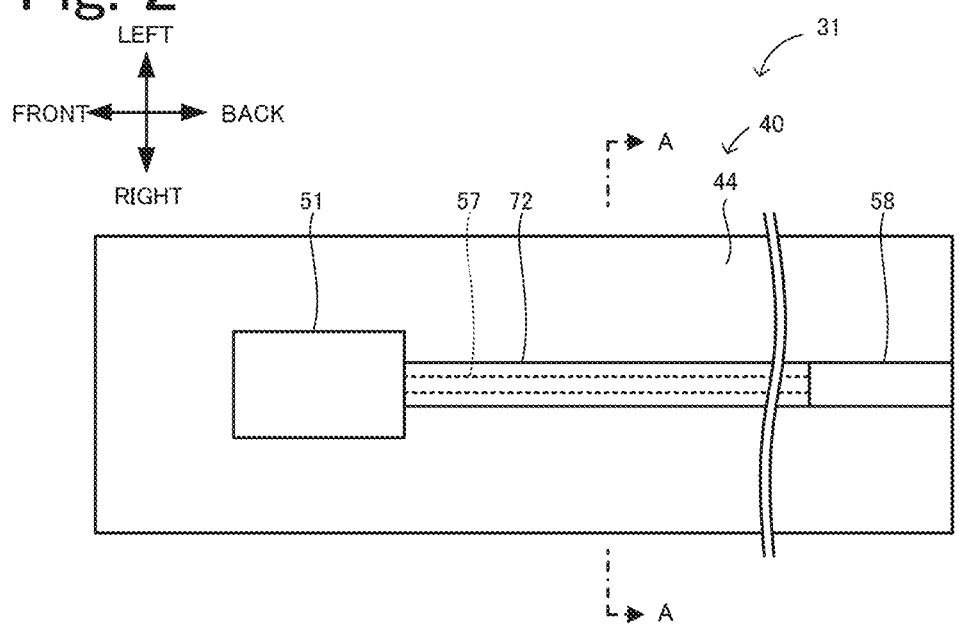
FIG. 2 is a top view of a sensor element 31 excluding a porous protective layer 48.
Figure 3:
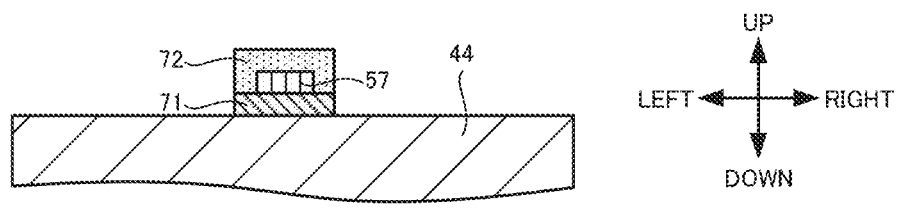
FIG. 3 is an A-A sectional view of FIG. 2.

Next, an embodiment of the present invention will be described with reference to the drawings. FIG. 1 is a diagram schematically showing a structure of a gas sensor 30 according to an embodiment of the present invention. FIG. 2 is a top view of a sensor element 31 excluding a porous protective layer 48. FIG. 3 is an A-A sectional view of FIG. 2. The sensor element 31 has a long rectangular parallelepiped shape. As shown in FIGS. 1 to 3, a longitudinal direction of an element main body 40 of the sensor element 31 is defined as a front-back direction (length direction), a stacking direction (thickness direction) of the element main body 40 is defined as a vertical direction, and a direction perpendicular to the front-back direction and the vertical direction is defined as a left-right direction (width direction).

The gas sensor 30 is, for example, installed in a pipe such as an exhaust gas pipe of a vehicle engine and is used to measure a specific gas concentration, which is a concentration of a specific gas contained in an exhaust gas as a measurement-object gas. Examples of the specific gas include ammonia ($NH_3$), carbon monoxide (CO), and hydrocarbon (HC). In this embodiment, the gas sensor 30 measures an ammonia concentration as the specific gas concentration. The gas sensor 30 includes a sensor element 31.

The sensor element 31 includes an element main body 40, a detection electrode 51, a reference electrode 53, a lead portion for detection electrode 57, a connecting terminal for detection electrode 58, a heater 62, a heater terminal 68, a lower insulating layer 71, and an upper insulating layer 72.

The element main body 40 includes four layers: a first substrate layer 41, a second substrate layer 42, a spacer layer 43, and a solid electrolyte layer 44, each being formed of an oxygen ion-conducting solid electrolyte body. The element main body 40 has a plate-like structure in which the four layers 41 to 44 are stacked in this order from the lower side in FIG. 1. The solid electrolyte constituting the four layers is dense and airtight. A front end side of the element main body 40 is exposed to a measurement-object gas. Furthermore, a reference gas introduction space 46 is formed, inside the element main body 40, in a location which is sandwiched between an upper surface of the second substrate layer 42 and a lower surface of the solid electrolyte layer 44 and delimited by the spacer layer 43 at the side thereof. The reference gas introduction space 46 has an opening on the back end side of the sensor element 31. For example, air is introduced into the reference gas introduction space 46 as a reference gas used during measurement of the ammonia concentration. Examples of the oxygen ion-conducting solid electrolyte include zirconia ($ZrO_2$). Each of the layers 41 to 44 may contain zirconia as a main component. Each of the layers 41 to 44 of the element main body 40 may be a substrate composed of a zirconia solid electrolyte to which 3 to 15 mol % of yttria ($Y_2O_3$) is added as a stabilizer (yttria-stabilized zirconia (YSZ) substrate).

The detection electrode 51 is disposed on the outer surface of the element main body 40. More specifically, the detection electrode 51 is disposed on the front end side of the upper surface of the solid electrolyte layer 44 in the element main body 40. The detection electrode 51 is a porous electrode. The detection electrode 51, the solid electrolyte layer 44, and the reference electrode 53 constitute a mixed potential cell 55. In the mixed potential cell 55, when a measurement-object gas is present around the detection electrode 51, at a three-phase boundary among a noble metal, a solid electrolyte, and a measurement-object gas, a specific gas (ammonia in this example) in the measurement-object gas induces an electrochemical reaction. As a result of this, in the detection electrode 51, a mixed potential (electromotive force EMF) is generated in accordance with the ammonia concentration in the measurement-object gas. An electromotive force EMF value between the detection electrode 51 and the reference electrode 53 is used to derive an ammonia concentration in the measurement-object gas. The detection electrode 51 contains, as a main component, a material that generates a mixed potential in accordance with an ammonia concentration and has detection sensitivity to an ammonia concentration. Specifically, the detection electrode 51 contains, as a noble metal, Pt (platinum) and Au (gold). Preferably, the detection electrode 51 contains a Au—Pt alloy as a main component. Here, the main component of the detection electrode 51 refers to a component having the highest abundance (atm %, atomic percentage) among all components contained in the detection electrode 51. The degree of concentration (=Au abundance [atom %]/(Au abundance [atom %]+Pt abundance [atom %])×100) measured by using X-ray photoelectron spectroscopy (XPS) of the detection electrode 51 is, for example, 40% or more. The degree of concentration may be 45% or more. The degree of concentration of the detection electrode 51 means the degree of surface concentration in a surface of noble metal particles of the detection electrode 51. For example, in the case where the degree of concentration is 50%, in a surface of noble metal particles constituting the detection electrode 51, an area of a portion at which Pt is exposed is equal to an area of a portion in which Au covers Pt. The Au abundance [atom %] is determined as a Au abundance in a surface of noble metal particles of the detection electrode 51. Similarly, the Pt abundance [atom %] is determined as a Pt abundance in a surface of noble metal particles of the detection electrode 51. The surface of noble metal particles may be set as a surface (e.g., upper surface in FIG. 1) of the detection electrode 51, or a cross section of the detection electrode 51. In the case where a surface (upper surface in FIG. 1) of the detection electrode 51 is exposed, the degree of concentration may be measured in the surface. On the other hand, as in this embodiment, in the case where the detection electrode 51 is covered with the porous protective layer 48, by measuring a cross section (cross section taken along the vertical direction) of the detection electrode 51 by using XPS, the degree of concentration is determined. As the degree of concentration increases, the Pt abundance in the surface of the detection electrode 51 decreases, and thereby, it is possible to suppress ammonia in the measurement-object gas from being decomposed by Pt around the detection electrode 51. Therefore, as the degree of concentration increases, derivation accuracy of the ammonia concentration by use of the gas sensor 30 tends to improve. Note that the upper limit of the degree of concentration is not particularly restricted, and for example, the degree of concentration of the detection electrode 51 may be 100%. However, the degree of concentration of the detection electrode 51 may be 50% or less. The detection electrode 51 may be a porous cermet electrode composed of a Au—Pt alloy and zirconia.

The reference electrode 53 is a porous electrode disposed inside the element main body 40. Specifically, the reference electrode 53 is disposed on the lower surface of the solid electrolyte layer 44, i.e., a side of the solid electrolyte layer 44 opposite to the side on which the detection electrode 51 is disposed. The reference electrode 53 is exposed to the reference gas introduction space 46, and a reference gas (air in this example) inside the reference gas introduction space 46 is introduced into the reference electrode 53. The potential of the reference electrode 53 serves as a reference for the electromotive force EMF. Note that the reference electrode 53 only needs to be a noble metal having catalytic activity. For example, as the reference electrode 53, Pt, Ir, Rh, Pd, or an alloy containing at least one of these can be used. In this embodiment, the reference electrode 53 is formed of Pt. The reference electrode 53 may be a porous cermet electrode composed of Pt and zirconia.

The lead portion for detection electrode 57 is a conductor for electrically connecting the detection electrode 51 and the connecting terminal for detection electrode 58. The lead portion for detection electrode 57 is disposed on the outside of the element main body 40. More specifically, the lead portion for detection electrode 57 is disposed on the upper surface of the element main body 40 so as to extend along the front-back direction. The lead portion for detection electrode 57 contains Pt. The lead portion for detection electrode 57 may be a conductor containing Pt as a main component. The term "main component" refers to a component having a volume fraction of 50% by volume or more or a component having the highest volume fraction among all components. The lead portion for detection electrode 57 may be composed of Pt and incidental impurities. Preferably, the lead portion for detection electrode 57 does not contain Au. The thickness of the lead portion for detection electrode 57 is, for example, 5 µm or more and 15 µm or less.

The connecting terminal for detection electrode 58 is disposed on the outside of the element main body 40. More specifically, the connecting terminal for detection electrode 58 is disposed on the back end side of the upper surface of the element main body 40. The connecting terminal for detection electrode 58 can be formed of the same material as that of the lead portion for detection electrode 57, and is formed of Pt in this embodiment. The connecting terminal for detection electrode 58 may be a conductor containing Pt as a main component. Note that a lead portion for reference electrode (not shown) which is electrically connected to the reference electrode 53 and includes a wiring pattern, a through-hole, and the like is disposed on the element main body 40. Furthermore, a connecting terminal for reference electrode (not shown) which is electrically connected to the lead portion for reference electrode is disposed on the upper surface or lower surface of the back end side of the element main body 40. The electromotive force EMF of the mixed potential cell 55 is measured from outside through the connecting terminal for detection electrode 58 and the connecting terminal for reference electrode.

The porous protective layer 48 covers the front end side of the surface of the element main body 40 including the detection electrode 51. As shown in FIG. 1, the porous protective layer 48 also covers part of the upper surface of the upper insulating layer 72. The porous protective layer 48, for example, plays a role of suppressing occurrence of cracks in the sensor element 31 due to adhesion of moisture and the like in the measurement-object gas. The porous protective layer 48 is, for example, formed of a ceramic containing, as a main component, any one of alumina, zirconia, spinel, cordierite, titania, and magnesia. In this embodiment, the porous protective layer 48 is formed of alumina. The porous protective layer 48 has a thickness of, for example, 20 to 1,000 µm. The porous protective layer 48 has a porosity of, for example, 15% to 60%. The sensor element 31 may not be provided with a porous protective layer 48.

The heater 62 plays a role in temperature adjustment of heating the element main body 40 (in particular, the solid electrolyte layer 44) and keeping it warm in order to enhance oxygen ion conductivity by activating the solid electrolyte of the element main body 40. The heater 62 is an electric resistor vertically sandwiched between the first substrate layer 41 and the second substrate layer 42. The heater 62 is connected to a heater terminal 68, which is disposed on the back end side of the lower surface of the element main body 40, through a lead wire and a through hole disposed inside the element main body 40. The heater 62 generates heat when electric power is supplied thereto from the outside through the heater terminal 68. The mixed potential cell 55 (in particular, the solid electrolyte layer 44) is controlled by heat generation of the heater 62 to a predetermined operating temperature. The operating temperature may be set, for example, at 600° C. or higher and 700° C. or lower.

The lower insulating layer 71 is an insulator which is disposed between the lead portion for detection electrode 57 and the element main body 40 and insulates the two from each other. As shown in FIG. 3, the lower insulating layer 71 is formed with a larger width than the lead portion for detection electrode 57. Furthermore, as shown in FIG. 1, the lower insulating layer 71 also insulates the connecting terminal for detection electrode 58 and the element main body 40 from each other. The lower insulating layer 71 may be formed of a ceramic containing a metal oxide having insulating properties. Preferably, the metal oxide contained in the lower insulating layer 71 is a material that does not have oxygen ion conductivity. In this embodiment, alumina is used as the metal oxide contained in the lower insulating layer 71. The lower insulating layer 71 has a thickness of, for example, 1 µm or more and 40 µm or less. The thickness of the lower insulating layer 71 may be 5 µm or more and may be 20 µm or less. The lower insulating layer 71 has a porosity of, for example, 0% or more and 40% or less. The lower insulating layer 71 may be dense, i.e., may have a porosity of 10% or less, or may not be dense. Even in the case where the lower insulating layer 71 is not dense, since the air inside the pores of the lower insulating layer 71 has insulating properties, the lead portion for detection electrode 57 and the element main body 40 can be insulated from each other.

The upper insulating layer 72 is an insulator which covers a surface of the lead portion for detection electrode 57. More specifically, as shown in FIG. 3, the upper insulating layer 72 covers the upper surface and left and right surfaces of the lead portion for detection electrode 57. Accordingly, the lead portion for detection electrode 57 is surrounded by the lower insulating layer 71 and the upper insulating layer 72 and is not exposed to the outside. The upper insulating layer 72 is dense, i.e., has a porosity of 10% or less. The upper insulating layer 72 may be formed of a ceramic containing a metal oxide having insulating properties. The metal oxide having insulating properties contained in the upper insulating layer 72 may be one or more selected from the group consisting of alumina ($Al_2O_3$), magnesia (MgO), spinel ($MgAl_2O_4$), titania ($TiO_2$), zirconia ($ZrO_2$), mullite ($Al_2O_3.SiO_2$), and forsterite ($2MgO.SiO_2$). Preferably, the metal oxide contained in the upper insulating layer 72 is a material that does not have oxygen ion conductivity. Therefore, preferably, the upper insulating layer 72 does not contain zirconia among the specific examples of the metal oxide described above. The metal oxide having insulating properties contained in the upper insulating layer 72 may be one or more selected from the group consisting of alumina, spinel, titania, mullite, and forsterite. In this embodiment, alumina is used as the metal oxide contained in the upper insulating layer 72. The upper insulating layer 72 may have a thickness of, for example, 1 µm or more, or 5 µm or more. The upper insulating layer 72 may have a thickness of 40 µm or less, or 20 µm or less.

Note that the porosity of the lower insulating layer 71, the upper insulating layer 72, or the like is defined as a value derived as follows, by using an image (SEM image) obtained by observation with a scanning electron microscope (SEM). First, the sensor element 31 is cut along the thickness direction of a measuring object (e.g., upper insulating layer 72) so that a cross section of the measuring object can be an observation surface, and the cross section is subjected to resin embedding and polishing to obtain a specimen for observation. Subsequently, by taking an SEM photograph (secondary electron image; accelerating voltage: 5 kV; magnification: 7,500×) of the observation surface of the specimen for observation, an SEM image of the measuring object is obtained. Next, by subjecting the obtained image to image analysis, a threshold is determined by a discriminant analysis method (Otsu's binarization) from the brightness distribution of the brightness data of pixels in the image. Then, on the basis of the determined threshold, the pixels in the image are binarized into a substance portion and a pore portion, and an area of the substance portion and an area of the pore portion are calculated. The ratio of the area of the pore portion to the total area (total of the area of the substance portion and the area of the pore portion) is derived as a porosity (unit of measure: %).

The gas sensor 30 includes, in addition to the sensor element 31, a protective cover, an element fixing member, and others (not shown). The protective cover surrounds and protects one end side in the longitudinal direction of the sensor element 31 on which the detection electrode 51 is disposed (the front end side in this example). The element fixing member fixes the sensor element 31 and also seals a space between the space inside the protective cover and the space around the opening of the reference gas introduction space 46 such that the measurement-object gas flowing in the protective cover does not flow in the reference gas introduction space 46.

A method of manufacturing the gas sensor 30 having such a configuration will be described below. First, a method of manufacturing a sensor element 31 will be described. In manufacturing the sensor element 31, first, a plurality of (four, in this example) unfired ceramic green sheets corresponding to an element main body 40 are prepared. As necessary, notches, through-holes, grooves, and the like are formed by punching or the like, and various patterns, such as electrodes and wiring, are screen-printed on the green sheets. The various patterns include patterns which, after firing, form a detection electrode 51, a reference electrode 53, a lead portion for detection electrode 57, a connecting terminal for detection electrode 58, a lower insulating layer 71, and an upper insulating layer 72. A thick pattern may be formed by performing a plurality of screen-printing operations. The patterns for the lower insulating layer 71, the lead portion for detection electrode 57, and the upper insulating layer 72 are formed in this order on an upper surface of a green sheet which forms a solid electrolyte layer 44. As a result of this, the pattern for the lead portion for detection electrode 57 is surrounded by the patterns for the lower insulating layer 71 and the upper insulating layer 72, and the pattern for the lead portion for detection electrode 57 is not exposed to the outside. After the necessary patterns are formed, a plurality of green sheets are stacked. The green sheets stacked constitute an unfired element main body which, after firing, forms an element main body. By firing the unfired element main body, an element main body 40 provided with the detection electrode 51, the reference electrode 53, the lead portion for detection electrode 57, the connecting terminal for detection electrode 58, the lower insulating layer 71, the upper insulating layer 72, and others is obtained. Subsequently, by forming a porous protective layer 48 by plasma thermal spraying, dipping, or the like, a sensor element 31 is obtained.

After the sensor element 31 has been produced, the sensor element 31 is inserted into an element fixing member, followed by sealing and fixing, and a protective cover is installed inside the element fixing member. As a result of this, a gas sensor 30 is obtained.

An example of use of the gas sensor 30 thus configured will be described below. First, the gas sensor 30 is installed in a pipe, and the mixed potential cell 55 is heated to the operating temperature by the heater 62. In this state, when a measurement-object gas flows in the pipe, the measurement-object gas reaches the detection electrode 51. As a result of this, the mixed potential cell 55 generates an electromotive force EMF in accordance with the ammonia concentration in the measurement-object gas. The electromotive force EMF is measured from the outside through the connecting terminal for detection electrode 58 and the connecting terminal for reference electrode. As described above, the electromotive force EMF is a value in accordance with the ammonia concentration in the measurement-object gas. Accordingly, correspondence between the electromotive force EMF and the ammonia concentration (also referred to as "output characteristics") is obtained by experiment in advance, and on the basis of the output characteristics and the measured electromotive force EMF, the ammonia concentration can be derived (measured).

Here, a study is made on the case where the sensor element 31 is not provided with an upper insulating layer 72, as a comparative example. In such a case, when the sensor element 31 is used at high temperatures for a long period of time, the output characteristics may change with use. That is, in some cases, an electromotive force EMF that is supposed to be generated is not generated (the electromotive force EMF decreases). The reason for such abnormality in the electromotive force is considered to be that, under high temperatures, Au in the detection electrode 51 evaporates and is deposited on (adheres to) Pt in the lead portion for detection electrode 57. Since Au and Pt react to form a solid solution, Au is likely to adhere to the lead portion for detection electrode 57 containing Pt. When this phenomenon occurs, it is considered that, for example, the amount of Au in the detection electrode 51 decreases, resulting in a decrease in the size of the three-phase boundary, and since the output characteristics change, abnormality in the electromotive force occurs. In contrast, in the gas sensor 30 according to this embodiment, the surface of the lead portion for detection electrode 57 is covered with the upper insulating layer 72 that is dense with a porosity of 10% or less. Therefore, occurrence of this phenomenon can be suppressed, and abnormality in the electromotive force is unlikely to occur.

Furthermore, in the case where the sensor element 31 is not provided with an upper insulating layer 72, the phenomenon in which Au in the detection electrode 51 evaporates and is deposited on Pt in the lead portion for detection electrode 57 also occurs during firing in the process of manufacturing the sensor element 31. Usually, the temperature during firing is higher than the temperature during use for the sensor element 31, and in many cases, firing is performed at a temperature higher than the melting point of Au. Therefore, this phenomenon is more likely to occur during firing. Concerning this problem, since the sensor element 31 according to this embodiment is provided with the upper insulating layer 72, in the process of manufacturing the sensor element 31, as described above, the pattern for the lead portion for detection electrode 57 is covered with the pattern for the upper insulating layer 72. Therefore, during firing, adhesion of Au to Pt in the pattern for the lead portion for detection electrode 57 can be suppressed. Accordingly, in the sensor element 31 according to this embodiment, it is possible to suppress occurrence of abnormality in the electromotive force due to the phenomenon described above during firing.

Furthermore, when the phenomenon described above occurs during use or during firing, Au adheres to the pattern for the lead portion for detection electrode 57, and when the Au further melts, Au may move to the outside of the pattern for the lower insulating layer 71 and come into contact with a green sheet in some cases. In this case, part of the fired lead portion for detection electrode 57 is not insulated by the lower insulating layer 71 and is in direct contact with the solid electrolyte layer 44. Then, since the lead portion for detection electrode 57 contains Au adhering to Pt, as in the detection electrode 51, a mixed potential may be generated by a measurement-object gas. As a result of this, for example, a battery is formed between the detection electrode 51-solid electrolyte layer 44-lead portion for detection electrode 57 and between the reference electrode 53-solid electrolyte layer 44-lead portion for detection electrode 57, resulting in loop current flow, and abnormality in the electromotive force may occur in some cases. Furthermore, because of a difference in the amount of adhering Au in the lead portion for detection electrode 57, a battery is formed between two points having different mixed potential values (between the lead portion for detection electrode 57-solid electrolyte layer 44-lead portion for detection electrode 57), resulting in loop current flow, and abnormality in the electromotive force may occur in some cases. Since the sensor element 31 according to this embodiment is provided with the upper insulating layer 72, it is possible to suppress abnormality in the electromotive force due to the occurrence of a mixed potential in the lead portion for detection electrode 57 as described above.

As the thickness of the upper insulating layer 72 increases, evaporated Au becomes less likely to pass through the upper insulating layer 72. From this viewpoint, the thickness of the upper insulating layer 72 is preferably 1 μm or more, and more preferably 5 μm or more. Furthermore, as the porosity of the upper insulating layer 72 decreases, evaporated Au becomes less likely to pass through the upper insulating layer 72. From this viewpoint, the porosity of the upper insulating layer 72 is preferably 5% or less, and more preferably less than 5%.

Preferably, the upper insulating layer 72 does not contain a Mg-containing metal oxide (e.g., magnesia, spinel, or forsterite). The reason for this is that Mg may penetrate zirconia of the element main body 40, for example, during firing, and when Mg reaches between the detection electrode 51 and the element main body 40, there is a possibility that the output characteristics of the sensor element 31 will change. Regarding titania, there is also a possibility that titania will form a compound (e.g., $ZrTiO_4$) with zirconia of the element main body 40 during firing, and as in the Mg-containing metal oxide, the output characteristics of the sensor element 31 will change. Therefore, preferably, the upper insulating layer 72 does not contain titania.

In the gas sensor 30 according to this embodiment described above in detail, since the surface of the lead portion for detection electrode 57 is covered with the dense upper insulating layer 72 having a porosity of 10% or less, it is possible to suppress occurrence of a phenomenon in which Au in the detection electrode 51 evaporates and adheres to the lead portion for detection electrode 57 during firing and during use, and abnormality in the electromotive force is unlikely to occur.

Furthermore, since the upper insulating layer 72 has a thickness of 1 μm or more, adhesion of Au to the lead portion for detection electrode 57 can be more reliably suppressed. Furthermore, since the upper insulating layer 72 has a thickness of 40 μm or less, it is possible to suppress fracture of the sensor element 31 due to a difference in thermal expansion between the element main body 40 (in particular, the layers 41 to 44) and the upper insulating layer 72 during firing and during use.

It is to be understood that the present invention is not limited to the embodiments described above, and various modifications to the embodiments are possible within the technical scope of the present invention.

For example, in the embodiment described above, the electrode formed on the outer surface of the element main body 40 is the detection electrode 51 alone. However, another electrode may be formed. For example, a detection electrode 51 and an auxiliary electrode may be provided on the upper surface of the solid electrolyte layer 44. In this case, the auxiliary electrode, the solid electrolyte layer 44, and the reference electrode 53 may be configured to constitute an electrochemical concentration cell. In this way, on the basis of a difference in electromotive force V, which is a potential difference corresponding to a difference in oxygen concentration between the auxiliary electrode and the reference electrode 53, an oxygen concentration in the measurement-object gas can also be detected. The auxiliary electrode may be a noble metal having catalytic activity, and for example, the same material as that for the reference electrode 53 described above can be used.

In the embodiment described above, the lower insulating layer 71 and the upper insulating layer 72 are disposed around the lead portion for detection electrode 57, but the present invention is not limited thereto. In the case where there is another lead portion disposed on the outer surface of the element main body 40, preferably, the surroundings of the lead portion are also covered with an insulating layer. For example, in the case where the auxiliary electrode is provided, preferably, the surroundings of a lead portion electrically connected to the auxiliary electrode are also covered with an insulating layer.

Examples

Examples in which a sensor element is specifically fabricated will be described below. Note that Experimental Examples 1 and 3 to 5 correspond to examples of the present invention, and Experimental Examples 2 and 6 correspond to comparative examples. It is to be understood that the present invention is not limited to the examples described below.

Experimental Example 1

The same element as the sensor element 31 shown in FIGS. 1 to 3 except that a porous protective layer 48 was not provided was produced, as Experimental Example 1, by the manufacturing method described above. Specifically, first, as the layers of an element main body 40, four unfired ceramic green sheets were prepared, the green sheets containing, as a ceramic component, a zirconia solid electrolyte to which 3 mol % of yttria wad added as a stabilizer. A plurality of sheet holes used for positioning during printing and stacking, through-holes required, and the like were formed in advance in the green sheets. Furthermore, in a green sheet for forming a spacer layer 43, a space to be used as a reference gas introduction space 46 was provided by punching or the like in advance. Then, a pattern printing/drying process was conducted in which various patterns were formed by screen printing on the ceramic green sheets so as to be suited to the first substrate layer 41, the second substrate layer 42, the spacer layer 43, and the solid electrolyte layer 44. When the pattern printing/drying process was completed, a printing/drying process for a bonding paste for stacking/boning the green sheets corresponding to the individual layers was conducted. Subsequently, a pressure bonding process was conducted in which, while positioning the green sheets provided with the bonding paste, the green sheets were stacked in a predetermined order, and pressure bonding was performed under predetermined temperature/pressure conditions to obtain a multilayer body (unfired element main body). A multilayer body having the size of a sensor element 31 was cut out from the unfired element main body thus obtained. By firing the cut-out multilayer body in an ambient atmosphere at 1,400° C. for three hours, a sensor element 31 of Experimental Example 1 was obtained.

In Experimental Example 1, the detection electrode 51 was a porous cermet electrode composed of a Au—Pt alloy and zirconia. A pattern for the detection electrode 51 was formed by using a paste prepared by mixing coated powder obtained by coating Pt powder with Au, zirconia powder, and binder. The reference electrode 53 was a porous cermet electrode composed of Pt and zirconia. A pattern for the reference electrode 53 was formed by using a paste prepared by mixing Pt powder, zirconia powder, and a binder. The lower insulating layer 71 was formed of a ceramic composed of alumina. A pattern for the lower insulating layer 71 was formed by using a paste prepared by mixing raw material powder (alumina powder with an average particle size of 1.5 µm), a binder solution (polyvinyl acetal and Butyl Carbitol), and a solvent (acetone). This paste was obtained by, after weighing 54 vol % of the raw material powder and 46 vol % of the binder solution, adding the solvent thereto, mixing with a mortar machine, and adjusting the viscosity to 20 Pa·s. The lead portion for detection electrode 57 was formed of Pt. A pattern for the lead portion for detection electrode 57 was formed by using a platinum paste obtained by kneading platinum particles and a solvent. The upper insulating layer 72 was formed of a ceramic composed of alumina. A pattern for the upper insulating layer 72 was formed by using a paste prepared by mixing raw material powder (alumina powder with an average particle size of 1.0 µm), a binder solution (polyvinyl acetal and Butyl Carbitol), and a solvent (acetone). This paste was obtained by, after weighing 51 vol % of the raw material powder and 49 vol % of the binder solution, adding the solvent thereto, mixing with a mortar machine, and adjusting the viscosity to 200 Pa·s. The paste for the lower insulating layer 71 and the paste for the upper insulating layer 72 were formed so as to have the same width. In Experimental Example 1, the detection electrode 51 had a thickness of 15 µm. The lower insulating layer 71 had a thickness of 10 µm. The lead portion for detection electrode 57 had a thickness of 15 µm. The upper insulating layer 72 had a thickness of 10 µm. The porosity of the upper insulating layer 72 was measured by the method described above by using an SEM image. As a result, the average of measured values at three points (cut off after the decimal point) was 3%.

Experimental Example 2

A sensor element 31 was produced, as Experimental Example 2, in the same manner as in Experimental Example 1 except that the upper insulating layer 72 was formed of a ceramic composed of magnesia. A paste for forming the upper insulating layer 72 was obtained by, after weighing 50 vol % of raw material powder (magnesium hydroxide powder with an average particle size of 1.0 µm) and 50 vol % of the binder solution, adding the solvent thereto, mixing with a mortar machine, and adjusting the viscosity to 250 Pa·s. The porosity of the upper insulating layer 72, which was measured in the same manner as in Experimental Example 1, was 32%, and the upper insulating layer 72 was not dense.

Experimental Example 3

A sensor element 31 was produced, as Experimental Example 3, in the same manner as in Experimental Example 1 except that the upper insulating layer 72 was formed of a ceramic composed of spinel. A paste for forming the upper insulating layer 72 was obtained by, after weighing 51 vol % of raw material powder (spinel powder with an average particle size of 1.2 µm) and 49 vol % of the binder solution, adding the solvent thereto, mixing with a mortar machine, and adjusting the viscosity to 230 Pa·s. The porosity of the upper insulating layer 72, which was measured in the same manner as in Experimental Example 1, was 10%.

Experimental Example 4

A sensor element 31 was produced, as Experimental Example 4, in the same manner as in Experimental Example 1 except that the upper insulating layer 72 was formed of a ceramic composed of titania. A paste for forming the upper insulating layer 72 was obtained by, after weighing 51 vol % of raw material powder (titania powder with an average particle size of 1.5 µm) and 49 vol % of the binder solution, adding the solvent thereto, mixing with a mortar machine, and adjusting the viscosity to 200 Pa·s. The porosity of the upper insulating layer 72, which was measured in the same manner as in Experimental Example 1, was 6%.

Experimental Example 5

A sensor element 31 was produced, as Experimental Example 5, in the same manner as in Experimental Example 1 except that the upper insulating layer 72 was formed of a ceramic composed of zirconia. A paste for forming the upper insulating layer 72 was obtained by, after weighing 52 vol % of raw material powder (zirconia powder with an average particle size of 0.8 µm) and 48 vol % of the binder solution, adding the solvent thereto, mixing with a mortar machine, and adjusting the viscosity to 120 Pa·s. The porosity of the upper insulating layer 72, which was measured in the same manner as in Experimental Example 1, was 5%.

Experimental Example 6

A sensor element 31 was produced, as Experimental Example 6, in the same manner as in Experimental Example 1 except that the upper insulating layer 72 was not provided.

[Test 1: Measurement of Degree of Concentration of Detection Electrode 51 and Lead Portion for Detection Electrode 57]

Regarding each of Experimental Examples 1 to 6, the surface of the detection electrode 51 was measured by using XPS, and the degree of concentration (=Au abundance [atom %]/(Au abundance [atom %]+Pt abundance [atom %])×100) was measured. Furthermore, regarding Experimental Example 6 in which the lead portion for detection electrode 57 was exposed, the degree of concentration of the lead portion for detection electrode 57 was also measured. The measurement of the degree of concentration of the lead portion for detection electrode 57 was performed at three positions at a distance from the detection electrode 51 of 3 mm, 6 mm, and 10 mm. Regarding the lead portion for detection electrode 57 of each of Experimental Examples 1 to 5, because of being covered with the upper insulating layer 72, it was not possible to measure the degree of concentration in the surface, and since the cross-sectional area shown in FIG. 3 is small, it was not possible to measure the degree of concentration in a cross section. The measurement results are shown in Table 1. Table 1 also shows the material for the upper insulating layer, the porosity, and the result of Test 4 (degree of concentration after durability test) which will be described later.

insulating layer 72 exceeds 10% and the upper insulating layer 72 is not dense, Au passes through pores in the pattern for the upper insulating layer 72 and adheres to the pattern for the lead portion for detection electrode 57 during firing. In contrast, it is considered that, in Experimental Examples 1 and 3 to 5, each being provided with the upper insulating layer 72 having a porosity of 10% or less, the phenomenon described above does not occur or hardly occurs.

[Test 2: Confirmation of Output Characteristics]

Regarding each of the sensor elements 31 of Experimental Examples 1 to 6, the output characteristics were confirmed. Specifically, the oxygen concentration was fixed at 10% and the water vapor concentration was fixed at 5% in the measurement-object gas, and while changing the ammonia concentration as shown in Table 2, the electromotive force EMF was measured for each concentration. Nitrogen was a component (base gas) of the measurement-object gas, other than those described above, and the temperature was set at 120° C. The measurement-object gas was made to flow through a pipe with a diameter of 70 mm, and the flow rate was set at 200 L/min. The sensor element 31 was in a state where the mixed potential cell 55 was controlled to an operating temperature (650° C.) by the heater 62. The results are shown in Table 2 and FIG. 4.

TABLE 1

| | UPPER INSULATING LAYER | | DEGREE OF CONCENTRATION OF THE DETECTION ELECTRODE [%] | DEGREE OF CONCENTRATION OF THE LEAD PORTION [%] | | | DEGREE OF CONCENTRATION OF THE DETECTION ELECTRODE AFTER DURABILITY TEST [%] |
|---|---|---|---|---|---|---|---|
| | MATERIAL | POROSITY [%] | | DISTANCE FROM THE DETECTION ELECTRODE: 3 mm | DISTANCE FROM THE DETECTION ELECTRODE: 6 mm | DISTANCE FROM THE DETECTION ELECTRODE: 10 mm | |
| EXPERIMENTAL EXAMPLE 1 | ALUMINA | 3 | 48 | — | — | — | 48 |
| EXPERIMENTAL EXAMPLE 2 | MAGNESIA | 32 | 35 | — | — | — | 20 |
| EXPERIMENTAL EXAMPLE 3 | SPINEL | 10 | 47 | — | — | — | 48 |
| EXPERIMENTAL EXAMPLE 4 | TITANIA | 6 | 47 | — | — | — | 48 |
| EXPERIMENTAL EXAMPLE 5 | ZIRCONIA | 5 | 50 | — | — | — | 49 |
| EXPERIMENTAL EXAMPLE 6 | NONE | — | 34 | 30 | 23 | 21 | 21 |

As is evident from the results of Table 1, while the degree of concentration of the detection electrode 51 is about 50% in each of Experimental Examples 1 and 3 to 5, the degree of concentration decreases to about 35% in Experimental Examples 2 and 6, and the degree of concentration is smallest in Experimental Example 6. Furthermore, in Experimental Example 6, the degree of concentration of the lead portion for detection electrode 57 not containing Au, which originally should be 0%, is about 20% to 30%. Furthermore, as the distance from the detection electrode 51 decreases, the degree of concentration increases. From these results, it is inferred that, in Experimental Example 6, since the upper insulating layer 72 is not included, a phenomenon occurs in which Au evaporates from the pattern for the detection electrode 51 and adheres to the pattern for the lead portion for detection electrode 57 during firing. Furthermore, it is also inferred that the same phenomenon occurs in Experimental Example 2. That is, in Experimental Example 2, it is considered that, since the porosity of the upper

TABLE 2

| | ELECTROMOTIVE FORCE EMF [mV] | | | |
|---|---|---|---|---|
| | $NH_3$ CONCENTRATION 1 ppm | $NH_3$ CONCENTRATION 50 ppm | $NH_3$ CONCENTRATION 100 ppm | $NH_3$ CONCENTRATION 500 ppm |
| EXPERIMENTAL EXAMPLE 1 | 13.30 | 130.40 | 151.25 | 208.46 |
| EXPERIMENTAL EXAMPLE 2 | 13.40 | 103.47 | 117.15 | 149.35 |
| EXPERIMENTAL EXAMPLE 3 | 13.40 | 130.15 | 151.36 | 209.45 |
| EXPERIMENTAL EXAMPLE 4 | 13.48 | 131.48 | 152.67 | 208.31 |
| EXPERIMENTAL EXAMPLE 5 | 15.04 | 108.47 | 127.35 | 169.24 |
| EXPERIMENTAL EXAMPLE 6 | 13.53 | 101.47 | 116.49 | 139.35 |

Figure 4:
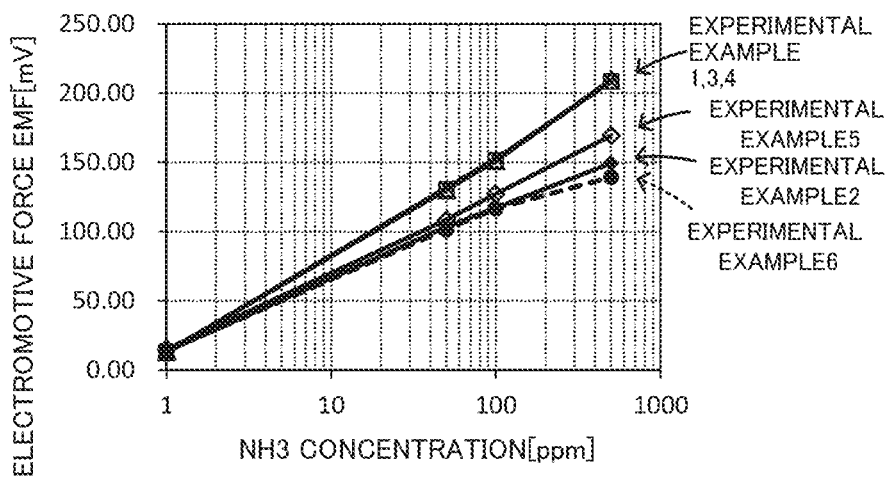
FIG. 4 is a graph showing output characteristics of a sensor element 31 in each of Experimental Examples 1 to 6.

As is evident from Table 2 and FIG. 4, Experimental Examples 1, 3, and 4 show substantially the same output characteristics. In Experimental Examples 2, 5, and 6, the electromotive force EMF value corresponding to the same ammonia concentration is low in comparison with Experimental Examples 1, 3, and 4. The electromotive force EMF value is lowest in Experimental Example 6, and in Experimental Example 2, the EMF value is low next to Experimental Example 6. In Experimental Examples 1 to 4 and 6, it is confirmed that as the degree of concentration of the detection electrode 51 shown in Table 1 decreases, the electromotive force EMF value shown in FIG. 4 tends to decrease. From this result, it is inferred that since the amount of Au in the detection electrode 51 is decreased, the electromotive force EMF decreases in Experimental Examples 2 and 6. Furthermore, the results of Test 3, which will be described later, show that, in Experimental Examples 2 and 6, a mixed potential occurs in the lead portion for detection electrode 57. As a result of this, loop current flows between the detection electrode 51-solid electrolyte layer 44-lead portion for detection electrode 57, between the reference electrode 53-solid electrolyte layer 44-lead portion for detection electrode 57, and between the lead portion for detection electrode 57-solid electrolyte layer 44-lead portion for detection electrode 57, which is also considered to influence the decrease in the electromotive force EMF shown in FIG. 4. Furthermore, the reason for the fact that the electromotive force EMF value of Experimental Example 5 is lower than that of Experimental Examples 1, 3, and 4 is considered to be as follows. First, since the paste for the upper insulating layer 72 of Experimental Example 5 sags (widens in width), the upper insulating layer 72 and the solid electrolyte layer 44 after firing are in contact with each other. Furthermore, since the upper insulating layer 72 is formed of zirconia, i.e., a solid electrolyte, the same as the solid electrolyte layer 44, a battery is formed between two points having different temperatures (between the detection electrode 51-solid electrolyte layer 44-lead portion for detection electrode 57, between the reference electrode 53-solid electrolyte layer 44-lead portion for detection electrode 57, and between the lead portion for detection electrode 57-solid electrolyte layer 44-lead portion for detection electrode 57), resulting in loop current flow due to thermoelectromotive force, leading to a decrease in the electromotive force EMF. Consequently, for example, in the case where, in Experimental Example 5, the width of the lower insulating layer 71 is sufficiently increased such that the upper insulating layer 72 does not come into contact with the solid electrolyte layer 44, there is a possibility that Experimental Example 5 will be able to have the same output characteristics as those of Experimental Examples 1, 3, and 4.

[Test 3: Confirmation of Output Characteristics after Removal of Detection Electrode]

Regarding each of the sensor elements 31 of Experimental Examples 1 to 6, after the detection electrode 51 was removed, the output characteristics were measured as in Test 2. The results are shown in Table 3 and FIG. 5.

TABLE 3

| | ELECTROMOTIVE FORCE EMF [mV] | | | |
|---|---|---|---|---|
| | $NH_3$ CONCENTRATION 1 ppm | $NH_3$ CONCENTRATION 50 ppm | $NH_3$ CONCENTRATION 100 ppm | $NH_3$ CONCENTRATION 500 ppm |
| EXPERIMENTAL EXAMPLE 1 | 0.20 | 0.10 | 0.10 | 0.10 |
| EXPERIMENTAL EXAMPLE 2 | −0.10 | 16.93 | 34.11 | 65.11 |
| EXPERIMENTAL EXAMPLE 3 | −0.10 | 0.03 | −0.10 | −0.10 |
| EXPERIMENTAL EXAMPLE 4 | 0.02 | 0.08 | 0.42 | 0.12 |
| EXPERIMENTAL EXAMPLE 5 | −1.74 | 11.93 | 20.90 | 39.22 |
| EXPERIMENTAL EXAMPLE 6 | −0.23 | 18.93 | 34.77 | 69.11 |

Figure 5:
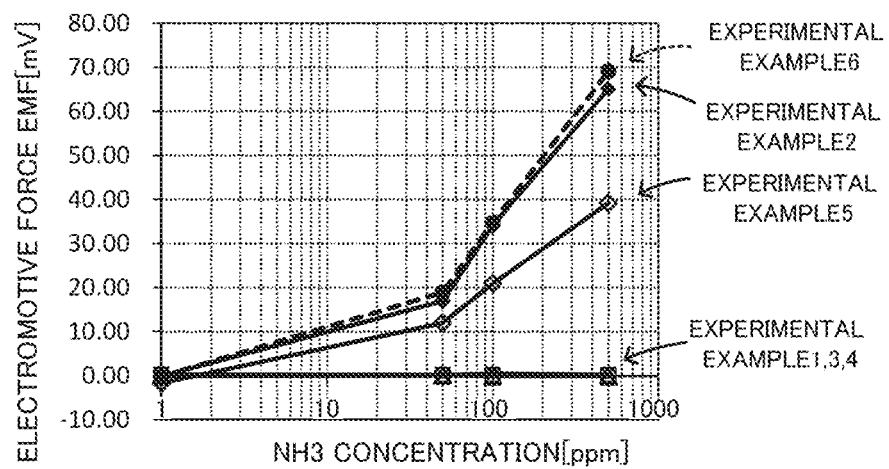
FIG. 5 is a graph showing output characteristics of a sensor element 31 after a detection electrode has been removed in each of Experimental Examples 1 to 6.

In Test 3, since the detection electrode 51 is removed, an electromotive force EMF is not supposed to be generated, and in Experimental Examples 1, 3, and 4, as shown in Table 3 and FIG. 5, the electromotive force EMF is substantially 0 mV. Thus, a normal result was obtained. In contrast, in Experimental Examples 2, 5, and 6, as shown in FIG. 5, there are output characteristics in which, as the ammonia concentration increases, the electromotive force EMF tends to increase. Furthermore, in FIG. 5, the electromotive force EMF value is highest in Experimental Example 6, and in Experimental Example 2, the EMF value is high next to Experimental Example 6. In Experimental Examples 1 to 4 and 6, it is confirmed that as the degree of concentration of the detection electrode 51 shown in Table 1 decreases, the electromotive force EMF value shown in FIG. 5 tends to increase. From this result, it is inferred that, in Experimental Examples 2 and 6, Au adheres to the pattern for the lead portion for detection electrode 57 during firing, and when the Au further melts, Au moves to the outside of the pattern for the lower insulating layer 71 and comes into contact with a green sheet; and as a result of this, a mixed potential occurs in the lead portion for detection electrode 57. As a result of this, it is considered that since loop current flows between the reference electrode 53-solid electrolyte layer 44-lead portion for detection electrode 57 and between the lead portion for detection electrode 57-solid electrolyte layer 44-lead portion for detection electrode 57, an electromotive force EMF occurs in Experimental Examples 2 and 6. The reason for the occurrence of the electromotive force EMF in experimental Example 5 in FIG. 5 is considered to be that, as described in the consideration of Test 2, since the upper insulating layer 72 is formed of a solid electrolyte (zirconia), even when the detection electrode 51 is removed, loop current flows between two points having different temperatures (between the reference electrode 53-solid electrolyte layer 44-lead portion for detection electrode 57 and between the lead portion for detection electrode 57-solid electrolyte layer 44-lead portion for detection electrode 57).

[Test 4: Confirmation of Output Characteristics after Durability Test]

Figure 6:
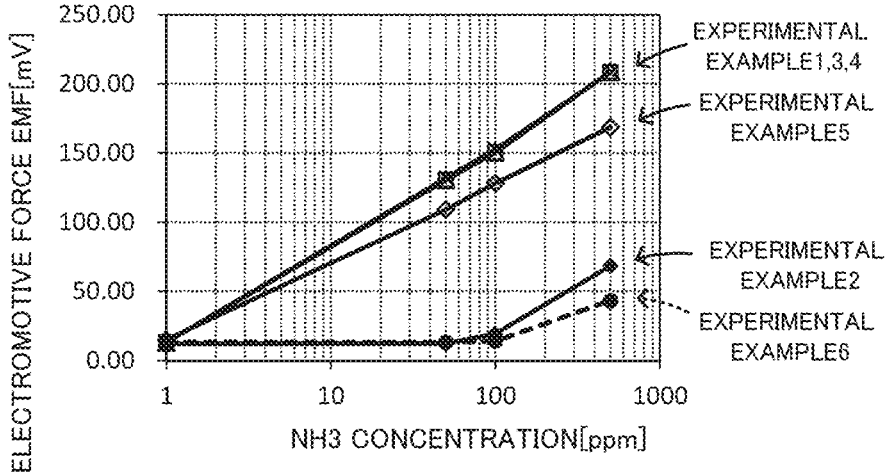
FIG. 6 is a graph showing output characteristics of a sensor element 31 after a durability test in each of Experimental Examples 1 to 6.
Figure 7:
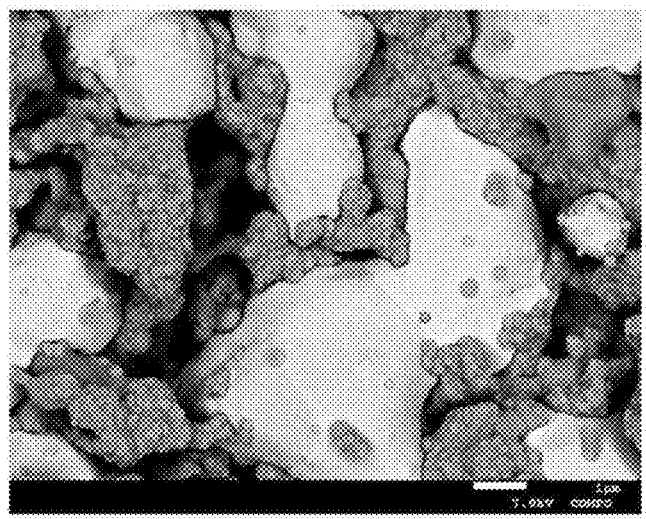
FIG. 7 is an SEM image of a surface of a detection electrode 51 before the durability test in Experimental Example 6.
Figure 8:
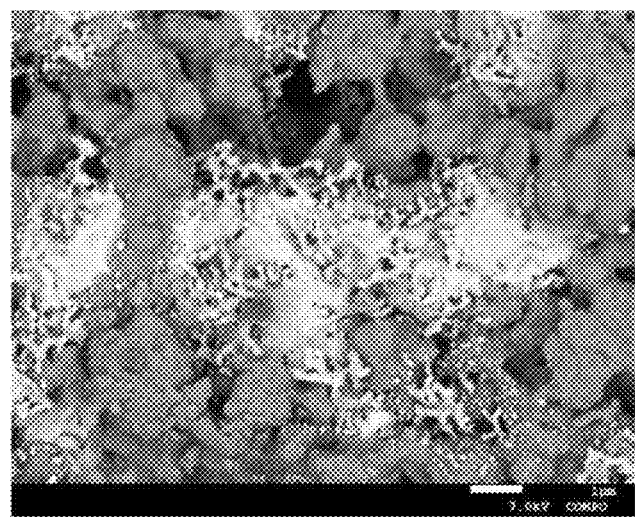
FIG. 8 is an SEM image of a surface of a detection electrode 51 after the durability test in Experimental Example 6.
Figure 9:
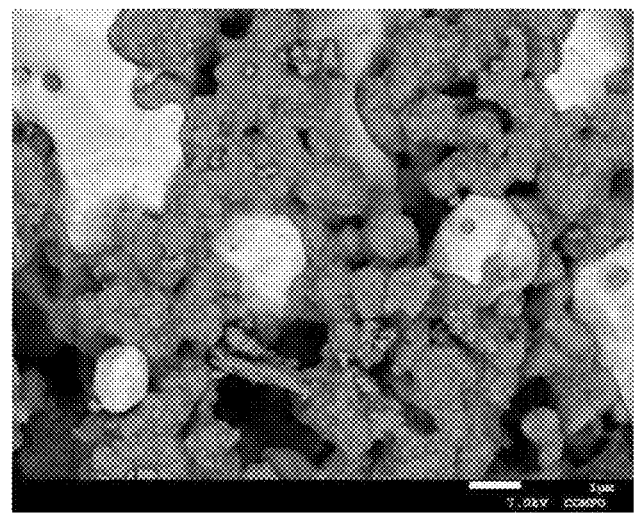
FIG. 9 is an SEM image of a surface of a detection electrode 51 after the durability test in Experimental Example 1.

Regarding each of the sensor elements 31 of Experimental Examples 1 to 6, a durability test was carried out to simulate long-term use. The durability test was carried out by exposing the sensor element, in a state where the mixed potential cell 55 was controlled to an operating temperature (650° C.) by the heater 62, to an exhaust gas of a diesel engine for 2,000 hours. After the durability test, regarding each of the sensor elements 31 of Experimental Examples 1 to 6, the degree of concentration (degree of concentration after durability test) of the detection electrode 51 was measured as in Test 1 and the output characteristics were measured as in Test 2. The results are shown in Table 1, Table 4, and FIG. 6. Furthermore, FIG. 7 is an SEM image of a surface of the detection electrode 51 before the durability test in Experimental Example 6. FIG. 8 is an SEM image of a surface of the detection electrode 51 after the durability test in Experimental Example 6. FIG. 9 is an SEM image of a surface of the detection electrode 51 after the durability test in Experimental Example 1. In FIGS. 7 to 9, noble metal particles in the detection electrode 51 are shown in white, pores are shown in black, and zirconia is shown in grey.

TABLE 4

| | ELECTROMOTIVE FORCE EMF [mV] | | | |
|---|---|---|---|---|
| | $NH_3$ CONCENTRATION 1 ppm | $NH_3$ CONCENTRATION 50 ppm | $NH_3$ CONCENTRATION 100 ppm | $NH_3$ CONCENTRATION 500 ppm |
| EXPERIMENTAL EXAMPLE 1 | 13.24 | 130.48 | 150.32 | 208.45 |
| EXPERIMENTAL EXAMPLE 2 | 12.00 | 12.14 | 19.48 | 68.35 |
| EXPERIMENTAL EXAMPLE 3 | 13.08 | 130.58 | 150.65 | 208.77 |
| EXPERIMENTAL EXAMPLE 4 | 13.26 | 131.82 | 152.58 | 208.40 |
| EXPERIMENTAL EXAMPLE 5 | 15.03 | 109.12 | 128.05 | 168.58 |
| EXPERIMENTAL EXAMPLE 6 | 13.30 | 13.14 | 14.14 | 43.14 |

As is evident from comparison between the degree of concentration after durability test and the degree of concentration in Test 1 shown in Table 1, in Experimental Examples 1 and 3 to 5, the degree of concentration does not substantially change before and after the durability test. In contrast, in Experimental Examples 2 and 6, the degree of concentration, which is already low at about 35% before the durability test (as manufactured), is decreased to about 20%. Furthermore, as is clear from FIGS. 7 and 8, in the detection electrode 51 of Experimental Example 6, after the durability test, noble metal particles tend to be fragmentized, and the amount of Au in the detection electrode 51 decreases from before the durability test. In contrast, as is clear from FIG. 9, in Experimental Example 1, fragmentation of noble metal particles is not seen after the durability test, and the amount of Au in the detection electrode 51 does not decrease from before the durability test. Furthermore, as is evident from comparison between Test 4 (FIG. 6 and Table 4) and Test 2 (FIG. 4 and Table 2), regarding Experimental Example 1 and 3 to 5, the output characteristics do not substantially change before and after the durability test. In contrast, in Experimental Examples 2 and 6, the output characteristics change after the durability test, and the electromotive force EMF value corresponding to the same ammonia concentration is decreased. From these results, it is inferred that, in Experimental Example 6 which is not provided with the upper insulating layer 72 and in Experimental Example 2 in which the upper insulating layer 72 has a high porosity and is not dense, a phenomenon in which Au in the detection electrode 51 evaporates and adheres to Pt in the lead portion for detection electrode 57 occurs under high temperatures during the durability test in the same manner as during firing. As a result, it is considered that, in Experimental Examples 2 and 6, as shown in FIG. 6, in comparison with before the durability test, the electromotive force EMF value further decreases after the durability test. From these results, it is assumed that because of long-term use, the phenomenon described above causes abnormality in the electromotive force, and it is considered that by providing a dense upper insulating layer 72, occurrence of the abnormality can be suppressed.

What is claimed is:

1. A sensor element, which is a mixed-potential-type sensor element that detects a specific gas concentration in a measurement-object gas, the sensor element comprising:
   an element main body having an oxygen ion-conducting solid electrolyte body;
   a detection electrode which is disposed on an outer surface of the element main body and contains Pt and Au and an Au concentration at a surface of noble metal particles of the detection electrode is at least 40% as calculated by a formula:

(Au abundance[atom %]/(Au abundance[atom %]+Pt abundance[atom %]))×100;

a reference electrode which is disposed in the element main body;
   a connecting terminal for the detection electrode which is disposed on the outside of the element main body;
   a lead portion for the detection electrode which contains Pt, is disposed on the outside of the element main body, and electrically connects between the detection electrode and the connecting terminal for the detection electrode;
   a lower insulating layer which is disposed between the lead portion for the detection electrode and the element main body and insulates the two from each other;
   an upper insulating layer which covers a surface of the lead portion for the detection electrode and has a porosity of 10% or less; and
   a porous protective layer which covers a surface of the detection electrode and at least a portion of a surface of the upper insulating layer and has a porosity of 15% to 60%.

2. The sensor element according to claim 1, wherein the upper insulating layer has a thickness of 1 μm or more.

3. The sensor element according to claim 1, wherein the upper insulating layer has a thickness of 5 μm or more.

4. The sensor element according to claim 1, wherein the upper insulating layer has a thickness of 40 μm or less.

5. The sensor element according to claim 1, wherein the upper insulating layer is formed of a ceramic containing a metal oxide having insulating properties.

6. The sensor element according to claim 5, wherein the metal oxide having insulating properties is one or more selected from the group consisting of alumina, spinel, titania, mullite, and forsterite.

7. A gas sensor comprising the sensor element according to claim 1.

* * * * *